(12) United States Patent
Yu

(10) Patent No.: US 11,427,386 B2
(45) Date of Patent: Aug. 30, 2022

(54) THERMOS WITH LOCKING DEVICE FOR LINER

(71) Applicant: Chun-Ming Yu, Taoyuan (TW)

(72) Inventor: Chun-Ming Yu, Taoyuan (TW)

( * ) Notice: Subject to any disclaimer, the term of this patent is extended or adjusted under 35 U.S.C. 154(b) by 255 days.

(21) Appl. No.: 16/841,017

(22) Filed: Apr. 6, 2020

(65) Prior Publication Data
US 2021/0206534 A1 Jul. 8, 2021

(30) Foreign Application Priority Data
Jan. 6, 2020 (TW) ................................. 109100312

(51) Int. Cl.
| | |
|---|---|
| *B65D 25/18* | (2006.01) |
| *B65D 81/38* | (2006.01) |
| *A47J 41/02* | (2006.01) |
| *A47J 41/00* | (2006.01) |

(52) U.S. Cl.
CPC .......... *B65D 25/18* (2013.01); *A47J 41/0077* (2013.01); *A47J 41/0088* (2013.01); *A47J 41/02* (2013.01); *B65D 81/3881* (2013.01)

(58) Field of Classification Search
CPC .. B65D 47/122; B65D 47/142; B65D 51/005; B65D 2255/20; B65D 41/04; B65D 2547/066; B65D 50/043; B65D 50/045; B65D 50/046; B65D 41/3404; B65D 41/3409; B65D 25/18; B65D 81/3881; A47J 41/0077; A47J 41/0061; A47J 41/02; A47J 41/0088
See application file for complete search history.

(56) References Cited

U.S. PATENT DOCUMENTS

| | | | | |
|---|---|---|---|---|
| 10,351,331 | B2 * | 7/2019 | Yu | ......................... B65D 1/0207 |
| 11,059,634 | B2 * | 7/2021 | Yu | ........................ A47J 41/0061 |
| 2006/0065132 | A1 * | 3/2006 | Jongen | ............... B65D 83/0055 99/485 |
| 2006/0151630 | A1 * | 7/2006 | Joseph | ................... B01D 35/28 222/105 |
| 2014/0091097 | A1 * | 4/2014 | Lane | .................. B65D 81/3841 220/592.2 |

FOREIGN PATENT DOCUMENTS

TW M500536 5/2015

* cited by examiner

*Primary Examiner* — Javier A Pagan
(74) *Attorney, Agent, or Firm* — Muncy, Geissler, Olds & Lowe, P.C.

(57) ABSTRACT

The present invention discloses a locking device for replacing a liner in a thermos. The locking device locks and positions a liner stably by a high-pressure assembling force resulted from an elastic effect, after replacing and assembling the liner in a drinking container. A tightening ring with an elastic force is utilized primarily. The tightening ring is clamped between a mineral liner and a barrel by filling, forming a strong elastic reaction force to press and lock the elements, through a spinning action of a connecting ring.

14 Claims, 7 Drawing Sheets

THERMOS WITH LOCKING DEVICE FOR LINER

BACKGROUND OF THE INVENTION a) Field of the Invention

The present invention relates to a locking device for replacing a liner in a thermos, and more particularly to a locking device that locks and positions a liner stably with an elastic effect after replacing and assembling the liner in a drinking container. The locking mechanism utilizes primarily an elastic force from a tightening ring to result in an elastic combining ability at high pressure by a locking action of a connecting ring, so that the mineral liner can be combined stably in the barrel, and the mineral liner can be withdrawn and replaced after pulling out the connecting ring.

b) Description of the Prior Art

During the leisure time in taking an outdoor activity, many designs of thermos containers can be used for keeping temperature of foods or beverages. The thermos containers are basically based on the adiabatic effect, in order to preserve the temperature of foods or beverages. In an early design, the liner in the thermos is made of metal or plastic, which is unable to withstand various chemical properties of the foods, such as acid-base or salinity. Therefore, the interior surface of the metallic liner can be coated with Teflon as a basis for withstanding acid-base. However, the Teflon coating will be worn out after brushing the liner.

A Taiwanese patent No. 103212060 discloses a thermos with a ceramic liner, wherein an outer bottle is disposed outside the main body of the thermos, and a ceramic liner is disposed in the space within the thermos. A top rim of the ceramic liner is an upper annular opening which is tightly combined with the rim of ceramic liner by sheathing. However, as ceramic is brittle, it is not appropriate for combining the upper annular opening with the rim of ceramic liner by squeezing. In addition, while using the thermos, the ceramic liner will absorb a shock wave and fracture when the bottle is subjected to an external force.

Moreover, although there are replaceable designs for a conventional thermos with the ceramic liner, the design of safety protection and effective combination is not available.

SUMMARY OF THE INVENTION

A primary object of the present invention is to provide a locking device for replacing a liner in a thermos, wherein the locking device locks and positions a liner stably with an elastic effect after replacing and assembling the liner in a drinking container. The locking mechanism utilizes primarily a tightening ring with an elastic force, which is clamped between a mineral liner and a barrel by filling. The tightening ring is acted upon by the spinning of a connecting ring to result in a strong reaction force, so that the liner can be locked and assembled by the elastic tightening action.

A second object of the present invention is to provide a locking device for replacing a liner in a thermos, wherein an outer surface on a top end of the barrel is provided with a twist-on member, an inner circumference of the twist-on member is provided with a binding plane, an inner bottom of the binding plane is annularly provided with an inner shoulder plane, an upper part of the connecting ring is provided with a covering thread, a lower part of the connecting ring is provided with a lock-joint member, an inner circumference of the lock-joint member is provided with an inner thread, and a top end of the inner thread is provided with a push-down inner shoulder. A spinning lead of the inner thread is provided, allowing the push-down inner shoulder to actually push down the tightening ring that the tightening ring can be forced upon actually.

A third object of the present invention is to provide a locking device for replacing a liner in a thermos, wherein a top surface of the tightening ring is a surface of a snapping structure and the push-down inner shoulder of the connecting ring is provided correspondingly with a snap tooth to fix the connecting ring with the spinning end of the barrel by mechanical snapping.

A fourth object of the present invention is to provide a locking device for replacing a liner in a thermos, wherein a front end or a rear end of a helical line of the twist-on member of the barrel is provide with a protruded buckle, and an interior of the inner thread of the connecting to ring is provided with an elastic slot corresponding to the buckle. Upon combining the twist-on member with the connecting ring to reach the end of locking, the buckle can be snapped in by the introduction of the elastic slot; therefore, the spinning angle of the connecting ring relative to the barrel will be immobilized to fix the locking angle.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
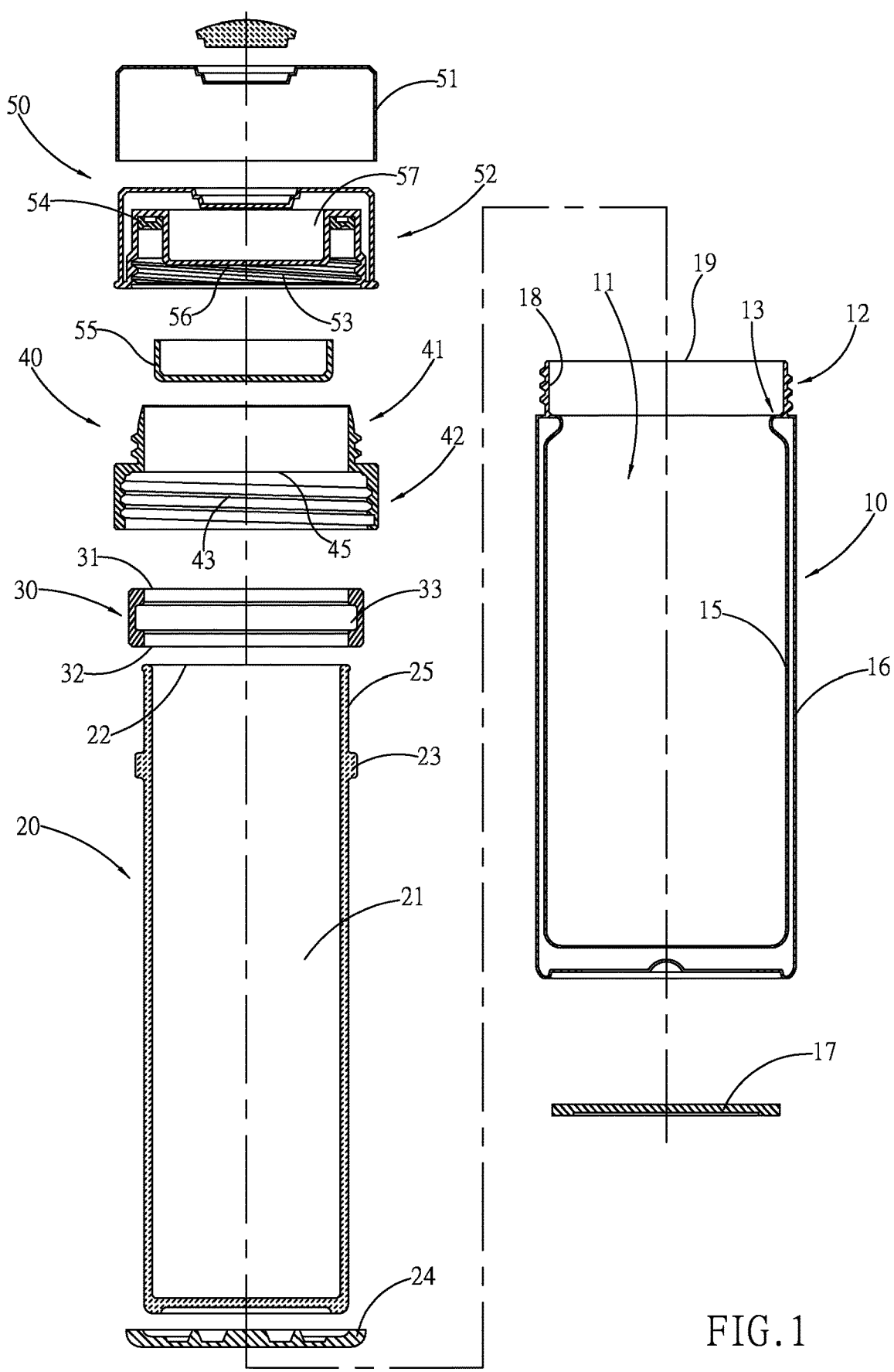
FIG. 1 shows a side exploded view of a thermos, according to the present invention.

The present invention discloses a locking device for replacing a liner in a thermos. The locking device locks and positions a liner stably with an elastic effect after replacing and assembling the liner in a drinking container. The locking mechanism utilizes primarily a tightening ring with an elastic force, which is clamped between a mineral liner and a barrel by filling. The tightening ring is acted upon by the spinning of a connecting ring to result in a reaction force, so that the liner can be locked and assembled by the elastic tightening action. An outer surface on a top end of the barrel is provided with a twist-on member, an inner circumference of the twist-on member is provided with a binding plane, an inner bottom of the binding plane is annularly provided with an inner shoulder plane, an upper part of the connecting ring is provided with a covering thread, a lower part of the connecting ring is provided with a lock-joint member, an inner circumference of the lock-joint member is provided with an inner thread, and the inner thread is coaxially provided with a push-down inner shoulder which has a diameter smaller than that of the inner thread and faces downward. The total height of the inner thread is smaller than that of the twist-on member, which provides a lead of the inner thread for maximum locking.

In addition, a top surface of the tightening ring is a surface of a snapping structure and the push-down inner shoulder of the connecting ring is provided correspondingly with a snap tooth to fix the connecting ring with the barrel at the terminal location robustly. Furthermore, the fixing method is that a front end or a rear end of a helical line of the twist-on member of the barrel is provide with a protruded buckle, and the two elements are locked together inside the inner thread of the connecting ring, with an elastic slot being disposed at a location corresponding to the buckle. After combining, the twist-on member and the connecting ring can be snapped together and positioned mechanically, and the spinning angle of the connecting ring relative to the barrel will be immobilized to fix the locking angle, thereby securing the combination among all elements without falling apart.

The implementation and operational functions of the present invention are described hereinafter by referring to the drawings.

First of all, please refer to FIG. 1. The present invention discloses a locking device for replacing a liner in a thermos. The locking device locks and positions a liner stably with an elastic effect after replacing and assembling the liner in a drinking container. As shown in the drawing, the embodiment of the locking device for replacing a liner in a thermos comprises a barrel 10. A top end of the barrel 10 is a port 19 which connects inward to form an axial space 11. A twist-on member 12 surrounds the outer part at the top end of the barrel 10, and a binding plane 18 is disposed at a height inside the axial space 11. A bottom of the binding plane 18 connects an annular inner shoulder plane 13 which is provided with a radial plane, and the binding plane 18 is further disposed on an inner surface relative to the twist-on member 12.

The main body of the barrel 10 is formed coaxially by an inner lining 15 and an outer barrel 16 to implement as a heat-resistant structure.

An outer bottom of the barrel 10 can be attached with a shock-absorption pad 17, and an inner bottom of the axial space 11 can be sheathed with a shock-proof tray 24.

The axial space 11 provides for the axial emplacement of a mineral liner 20. An interior of the mineral liner 20 is a loading space 21 which connects outward through an opening 22. An outer circumference of the opening 22 is a neck member 25, and a protruded radial collar 23 is disposed on the neck member 25, at a position corresponding to the binding plane 18 and the inner shoulder plane 13 inside the barrel 10. The mineral liner 20 can be made of ceramic, and its inner surface can be provided with a coating layer which emits a physical energy wave.

The sheathing between the radial collar 23 and the binding plane 18 is through a tightening ring 30 having an elastic force. A top end of the tightening ring 30 is a top end surface 31, and a lower end is a lower abutting surface 32. An annular concave ring 33 is concaved on an inner circumference corresponding to the radial collar 23, in order to enclose the outer surface of the radial collar 23. Upon being subjected to an external force, the tightening ring 30 can result in a strong reaction force, wherein the external force is formed by the pressing of a connecting ring 40. The connecting ring 40 is provided with a covering thread 41 and a lock-joint member 42. An inner circumference of the lock-joint member 42 is formed with an inner thread 43, and the inner circumference of the inner thread 43 is provided with an annular push-down inner shoulder 45 with a downward port and a smaller diameter. The push-down inner shoulder 45 presses down the tightening ring 30. The covering thread 41 provides for sealing a cover 50 to seal off the opening 22 of the mineral liner 20, and the covering thread 41 provides for the sheathing and assembling of the neck member 25 of the mineral liner 20, wherein the total height of the tightening ring 30 is larger than the total lead of the inner thread 43.

The cover 50 is provided with an outer sleeve 51, and an interior of the cover 50 is lined with an inner sleeve 52. A lower end of the inner sleeve 52 is provided with a sealing thread 53 at a height corresponding to the covering thread 41. Similarly, the cover 50 needs to have an outward heat-resistant effect, and can be provided with an inner chamber housing 56 to form a heat-resistant space 57 inside the cover 50. To allow the elements to further withstand high heat, an outer surface of the inner chamber housing 56 can be sheathed with a heat-resistant sheath 55 capable of withstanding high heat. An upper end at a periphery of the inner chamber housing 56 is provided with an annular seal washer 54 at a location corresponding to the sealing position of the opening 22 of the mineral liner 20. The seal washer 54 makes the opening 22 of the mineral liner 20 airtight.

Figure 2:
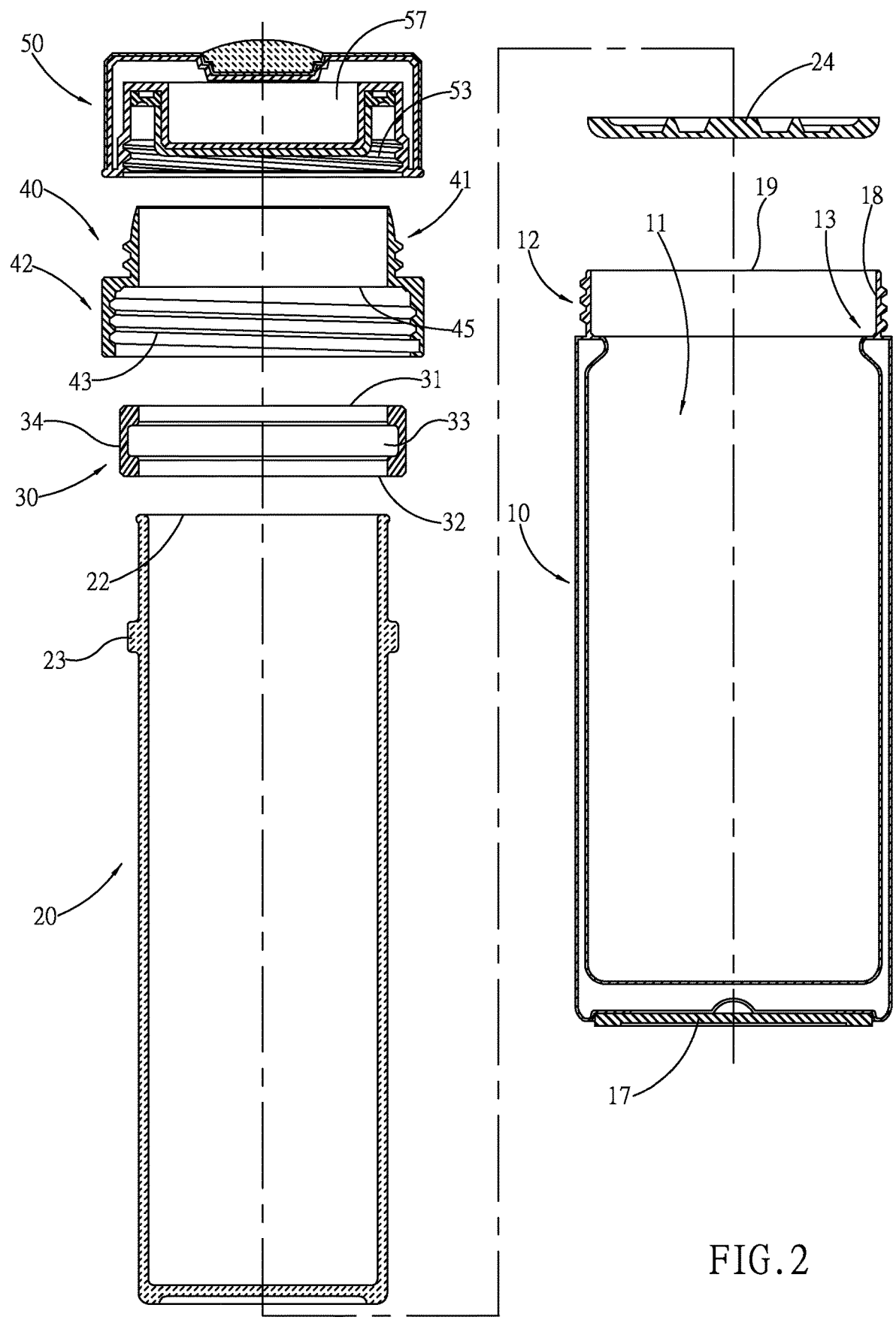
FIG. 2 shows another side exploded view of the thermos, according to the present invention.
Figure 3:
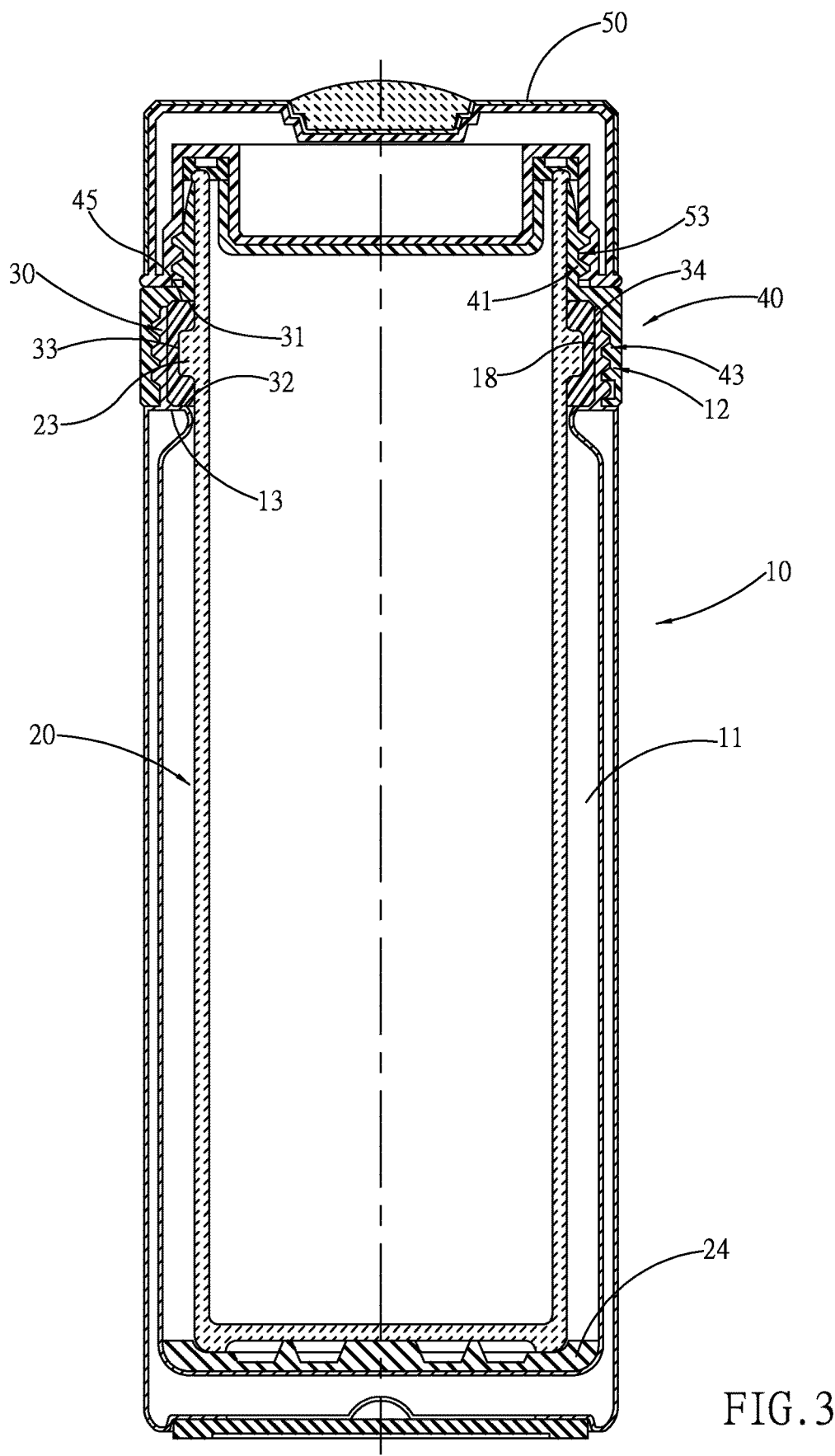
FIG. 3 shows a side assembly view of the thermos, according to the present invention.

Referring to FIG. 2 and FIG. 3, after assembling the cover 50, the interior of the cover 50 is formed with a heat-resistant space 57. The sealing thread 53 on the inner circumference at the lower part of the cover 50 spins to lock the covering thread 41, and the inner thread 43 of the lock-joint member 42 spins to lock the twist-on member 12 of the barrel 10.

Before assembling, the concave ring 33 of the tightening ring 30 is deformed elastically by the main body of the tightening ring 30, so that the diameter of the concave ring 33 can be changed to cross over the radial collar 23 that encloses the miner liner 20, and the concave ring 33 can enclose three outer surfaces of the radial collar 23, allowing the mineral liner 20 and the tightening ring 30 to be assembled preliminarily. The whole mineral liner 20 is sheathed into the axial space 11 through the port 19 of the barrel 10. Next, the outer circumference of the tightening ring 30 is attached onto the binding plane 18, and the lower abutting surface 32 is abutted downward on the inner shoulder plane 13.

In the process of locking the connecting ring 40 with the barrel 10 to fix the mineral liner 20 in the barrel 10, the displacement of the spinning lead of the inner thread 43 at the lower end of the connecting ring 40 relative to the twist-on member 12 will link the push-down inner shoulder 45, and the push-down inner shoulder 45 will press on the top end surface 31 of the tightening ring 30. The top end surface 31 is pressed to result in a conductive force which is exerted on the outer surface of the radial collar 23 as well as between the binding plane 18 and the inner shoulder plane 13, thereby obtaining an assembling force.

Referring to FIG. 3 again, the mineral liner 20 is axially sheathed into the axial space 11 of the barrel 10, and the outer surface at the lower end of the mineral liner 20 can press on the shock-proof tray 24. The shock-proof tray 24 is an elastic element and can support the lower end of the mineral liner 20, keeping the axis of the miner liner 20 to be overlapped with the axis of the barrel 10. After the connecting ring 40 spins to connect the barrel 10, the push-down inner shoulder 45 presses on the top end surface 31 of the tightening ring 30, allowing the tightening ring 30 to result in a strong elastic reaction force under an external force. The strong elastic reaction force acts onto the assembling surface between the corresponding elements.

The inner thread 43 at the lower end of the connecting ring 40 spins to combine with the twist-on member 12 of the barrel 10. The inner thread 43 is coaxially provided with a push-down inner shoulder 45 which is provided with a smaller diameter and has a downward port. The push-down inner shoulder 45 is linked by the change in the spinning to lead of the inner thread 43 relative to the twist-on member 12, and the result of assembling will be driven to press on the top end surface 31 of the tightening ring 30. The tightening ring 30 then transmits a stress from the main body thereof, resulting in a reaction force at a solid angle. The concave ring 33 then results in a pressure to press on the radial collar 23, the lower abutting surface 32 results in a lower abutting force to abut on the inner shoulder plane 13 of the barrel 10, and the outer circumference plane 34 results in an outward expansion force to press on the binding plane 18 of the barrel 10. Therefore, by the elastic force at the solid angle of the tightening ring 30, the radial collar 23 of the mineral liner 20 will be pressed on, allowing the mineral liner 20 to be positioned inside the barrel 10.

In addition, the top end surface 31 of the tightening ring 30 is pressed down by the push-down inner shoulder 45, and the resulted elastic reaction force will exert the pressure reversely, forming a tensile stress to the push-down inner shoulder 45 to cause a strong friction force. Therefore, the connecting ring 40 will be stopped without falling apart easily, thereby stopping the radial angle of the connecting ring 40 to achieve assembling and locking.

The covering thread 41 of the connecting ring 40 provides for the spinning of the sealing thread 53 of the cover 50. In opening the cover 50, as the friction force between the push-down inner shoulder 45 and the top end surface 31 is much larger than the friction force between the covering thread 41 and the sealing thread 53 by the strong elastic action, the resulted torque upon withdrawing the cover 50 will not affect the change in assembling angle of the connecting ring 40, so that the mineral liner 20 can be positioned in the barrel 10 stably.

In the above description, the three-dimensionally expanded reaction force resulted from the elastic force of the tightening ring 30 is utilized to firmly fix and assembly the barrel 10 with the mineral liner 20. In addition, by the strong elastic reaction force resulted from the downward pressing of the top end surface 31 to the push-down inner shoulder 45 of the connecting ring 40, the friction force between the inner thread 43 of the connecting ring 40 and the twist-on member 12 of the barrel 10 is larger than the friction force between the covering thread 41 and the sealing thread 53 of the cover 50. Thus, during the process of spinning to open the cover 50, the operational force will not affect the assembling angle between the connecting ring 40 and the barrel 10, which maintains the robust assembling force between the mineral liner 20 and the barrel 10.

Figure 4:
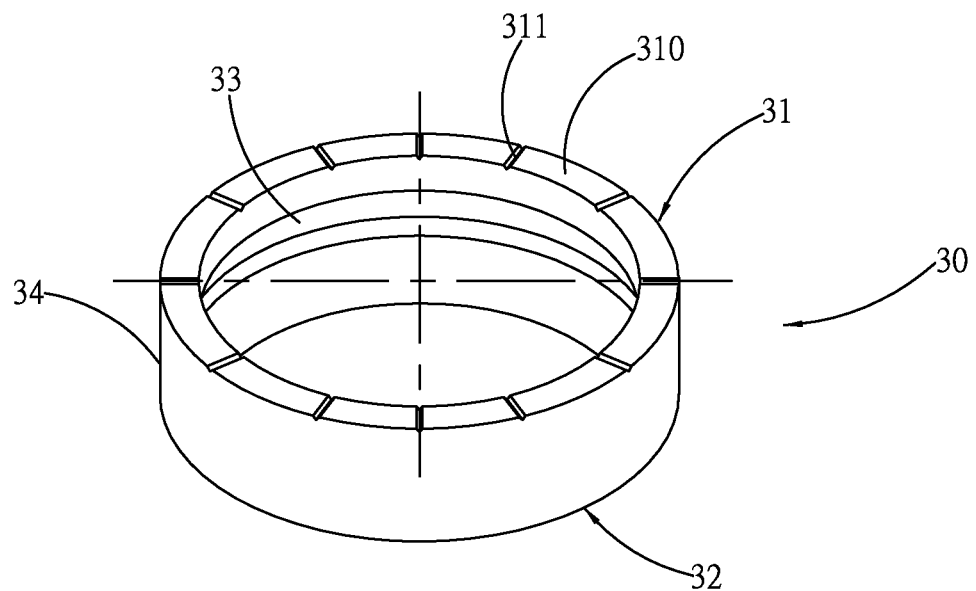
FIG. 4 shows a three-dimensional view of a tightening ring, according to the present invention.

Referring to FIG. 4 along with FIG. 3, the tightening ring 30 is a single body formed integrally by an elastic material, the top end of the tightening ring 30 is a top end surface 31, the lower end is a lower abutting surface 32, the outer circumference is a flat outer circumferential plane 34, the inner circumference is concaved with a concave ring 33, and the top end surface 31 can be implemented as a snapping structure 310. When the push-down inner shoulder 45 as shown in FIG. 3 is pressed down, a stopping force to friction can be provided to the angle, which assists the stopping force to friction that the top end surface 31 provides to the push-down inner shoulder 45, and assures that the connecting ring 40 will not affect the relative angle of the connecting ring 40 with respect to the barrel 10 by the exiting of the cover 50. The snapping structure 310 can be any concave-convex structure, and is further provided with notches 311 which are longitudinally parallel to the center radial lines of the top end surface 31. The notches 311 can absorb the stress deformation formed on the top end surface 31 when the push-down inner shoulder 45 is pressed down, keeping the friction area between the push-down inner shoulder 45 and the top end surface 31 at a maximum value.

Figure 5:
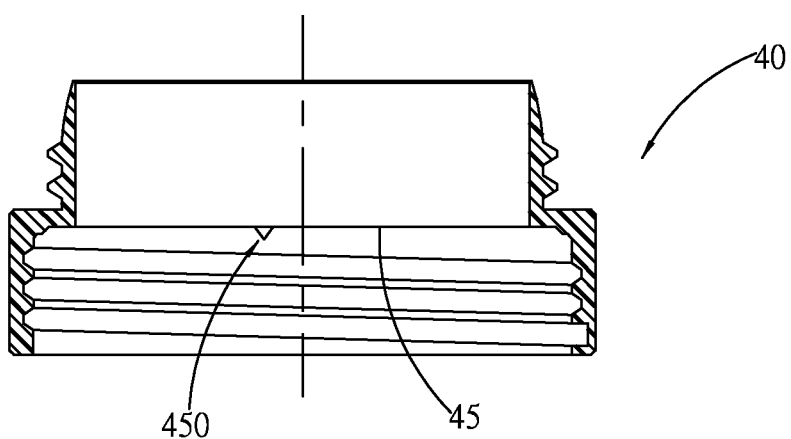
FIG. 5 shows a schematic view of a connecting ring with a snap tooth, according to the present invention.

Referring to FIG. 5, in accordance with the abovementioned to implementation of the snapping structure 310 and the notches 311, a protruded snap tooth 450 is disposed on the push-down inner shoulder 45 of the connecting ring 40, parallel to the longitudinal direction of the notches 311 as shown in FIG. 4. Upon engaging, the snap tooth 450 can be gnawed on the upper surface of the elastic top end surface 31 or sheared on the snapping structure 310 or the notches 311, which increases the mechanical positioning effect, such that when the connecting ring 40 spins the barrel 10 (as shown in FIG. 3), the relative radial angle between the two elements can be more stabilized.

Figure 6:
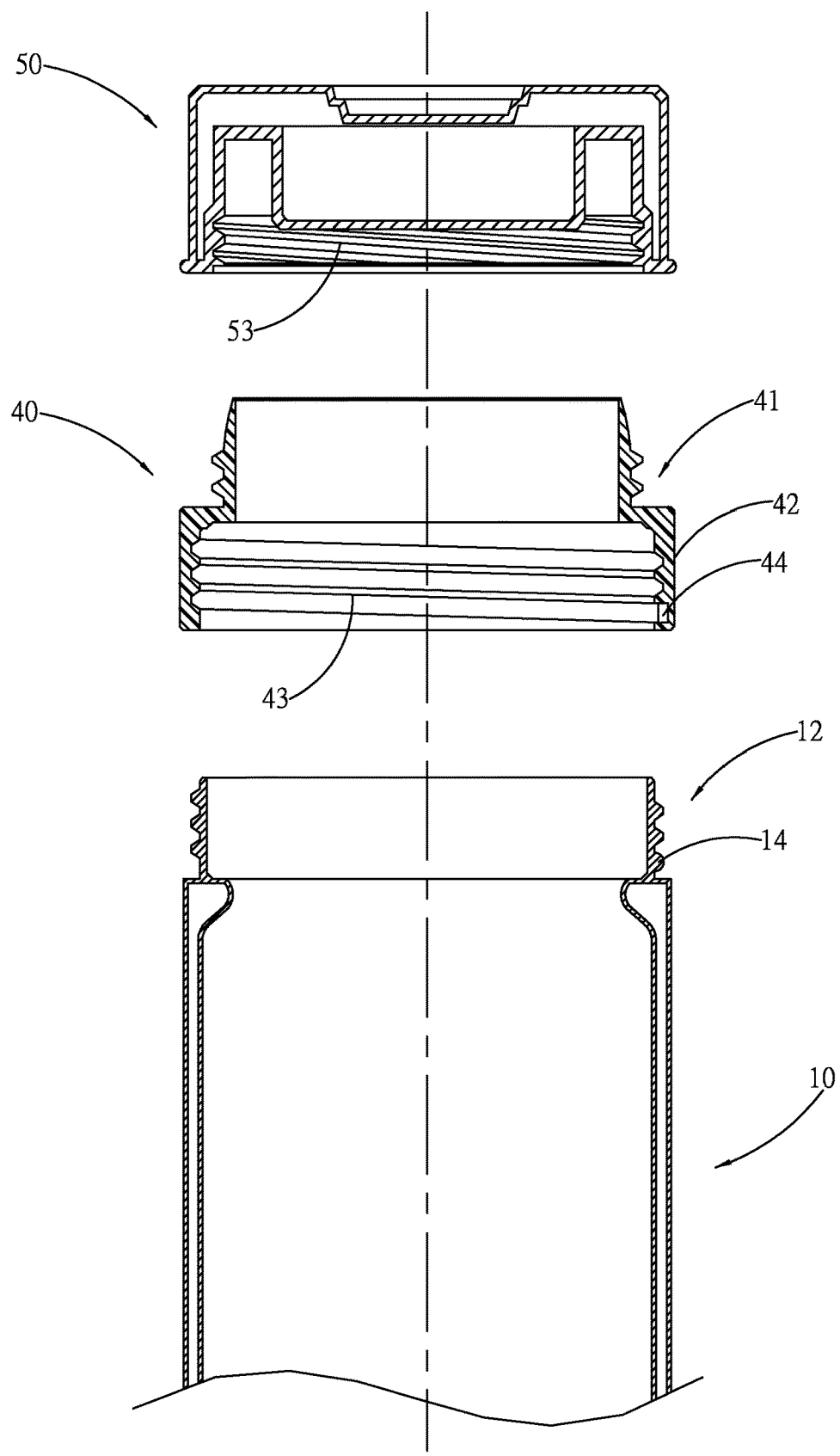
FIG. 6 shows a schematic view of a relative position between a buckle and an elastic slot, according to the present invention.
Figure 7:
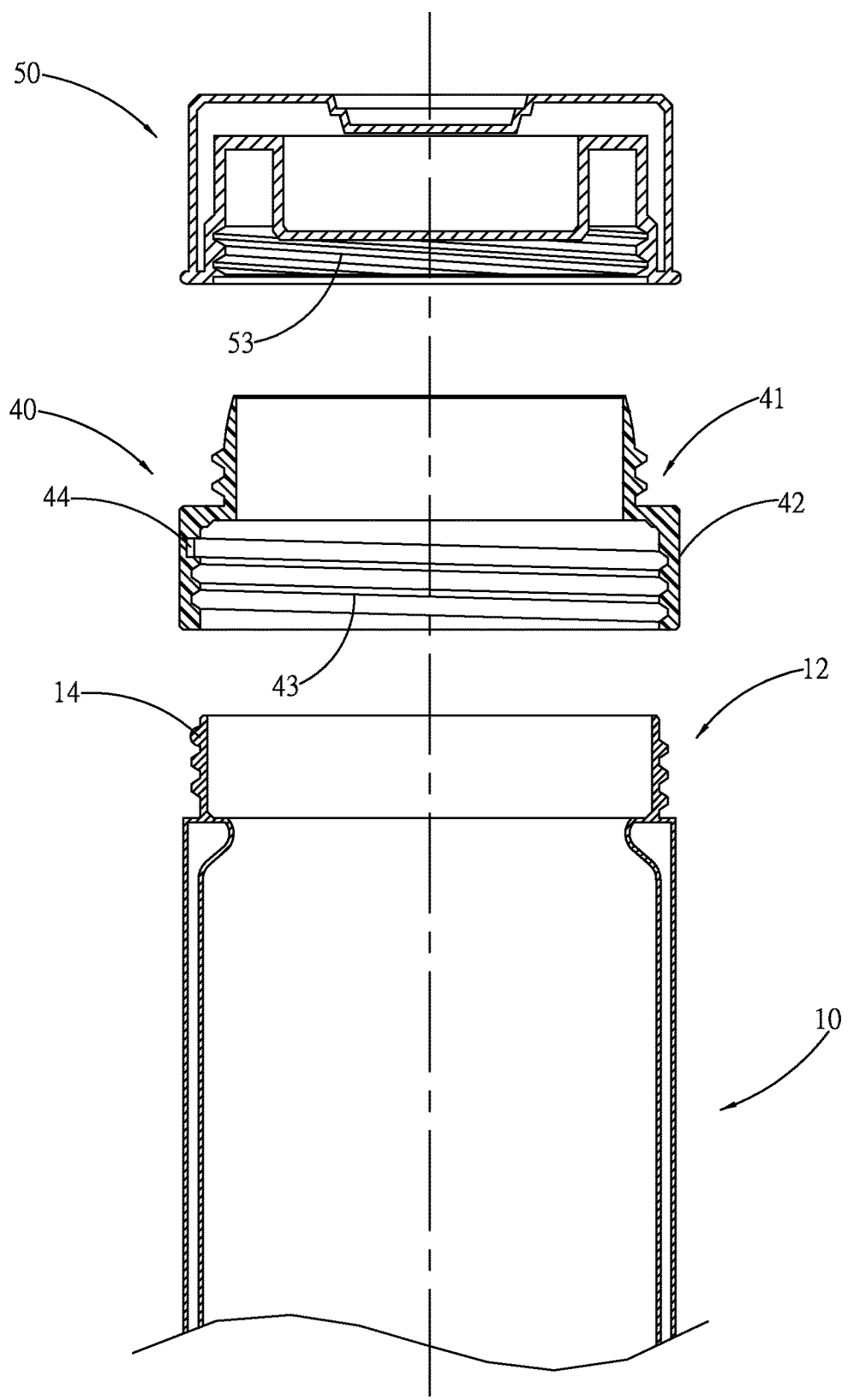
FIG. 7 shows another schematic view of the relative position between the buckle and the elastic slot, according to the present invention.

Referring to FIG. 6 and FIG. 7, the present invention further utilizes an explicit structure to assist locking. An interior of the lock-joint member 42 of the connecting ring 40 is provided with an elastic slot 44 which is positioned at the start of a helical line at a lower end or the end of the helical line at an upper end of the inner thread 43. The elastic slot 44 is a concave space and is formed integrally with the lock-joint member 42. The lock-joint member 42 is elastic and is provided with a little of elastic deformation ability, which links the elastic slot 44 to result in an elastic change in the radial length.

When the connecting ring 40 is locked with the twist-on member 12 of the barrel 10, the elastic slot 44 can spin into a buckle 14 which is to disposed on the outer surface of the twist-on member 12. The buckle 14 is a bump which is fixed homogenously on a front end or a tail end of the helical line of the twist-on member 12, and can be elastically restrained to fix the connecting ring 40 after the elastic slot 44 shears into the buckle 14.

The buckle 14 is at the lower end or upper end of the twist-on member 12, and its best angle occurs when the connecting ring 40 spins the barrel 10 until the two elements are locked tightly. At this time, the elastic slot 44 will be aligned with the buckle 14 exactly. As the elastic slot 44 is attached on the lock-joint member 42 and the lock-joint member 42 can be deformed elastically by a small amount, the elastic slot 44 can form an elastic shearing function and will be snapped into the buckle 14 eventually. Withdrawing the connecting ring 40 requires a strong force, and this strong force is larger than the abovementioned snapping force when the connecting ring 40 is separated from the barrel 10 by spinning the two elements oppositely.

The abovementioned elastic slot 44 can be a groove or any wedge to achieve snapping by latching.

Figure 8:
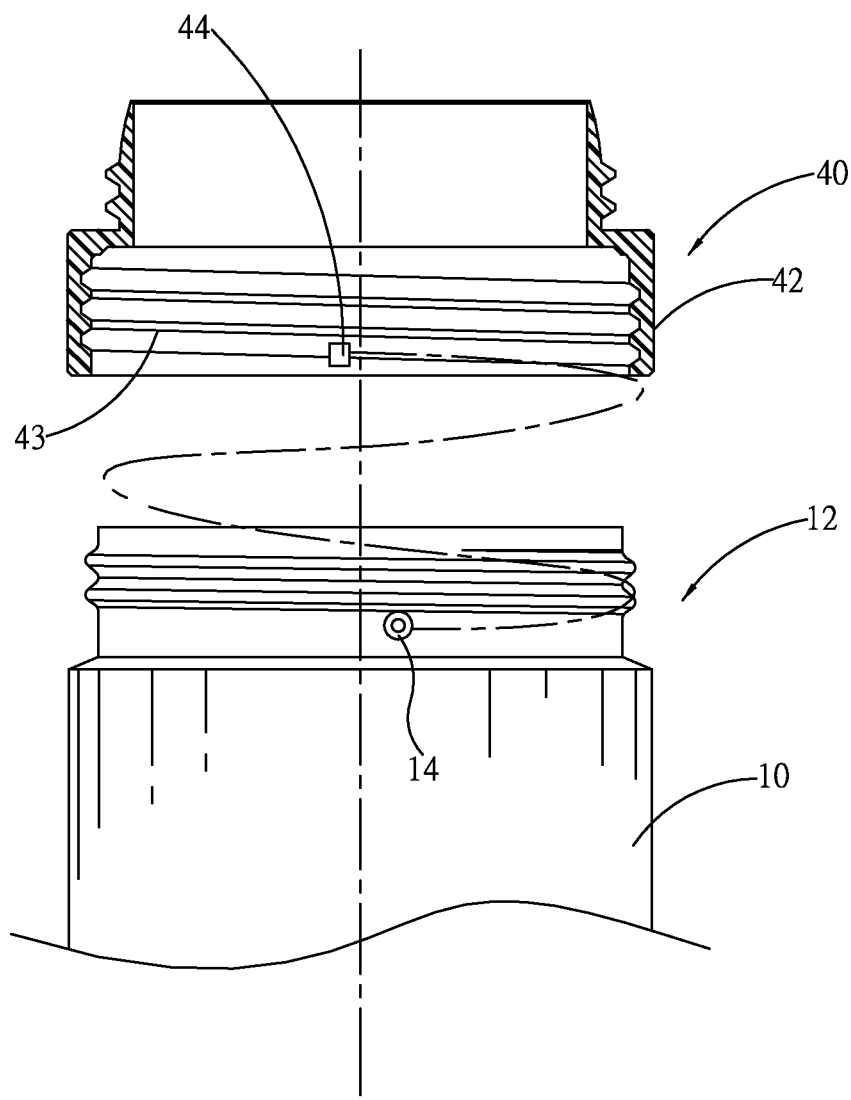
FIG. 8 shows a schematic view of an operation that the connecting ring is assembled with the barrel to link with the elastic slot and snap the buckle, according to the present invention.

Referring to FIG. 8, a bottom of the inner thread 43 provided by the connecting ring 40 is provided with an elastic slot 44 which can be a concave rabbet and can be deformed elastically by a small amount by the texture of the lock-joint member 42. After the inner thread 43 spins to connect the twist-on member 12 of the barrel 10, the elastic slot 44 is steered and driven to reach the buckle 14 which is fixed and protruded on the twist-on member 12. Therefore, by the small change in elasticity of the lock-joint member 42, the elastic slot 44 can be sheared and snapped to the buckle 44 elastically, and the connecting ring 40 will not escape from the barrel 10 easily by the restraining of the buckle 14.

The present invention discloses a locking device for replacing a liner in a thermos. The locking device locks and positions the liner stably by the elastic effect, after replacing and assembling the liner in a drinking container. The tightening ring with elastic effect is utilized primarily, and the concave ring can be sheathed on the radial collar of the mineral liner, with that the provided outer surface can press on the binding plane of the barrel. A push-down force resulted from the locking of the push-down inner shoulder of the connecting ring enables the tightening ring to form a three-dimensional elastic force. A strong pressing force for assembling is formed reversely by that elastic force to fix the mineral liner and the barrel. In addition, as the friction force between the top end surface of the tightening ring and the push-down inner shoulder is to strong, the mineral liner can be firmly fixed and positioned in the barrel. Furthermore, the elastic slot is disposed at the front or rear end of the inner thread, and the buckle is disposed at the front or rear end of the twist-on member of the barrel. Therefore, when the inner thread and the twist-on member are locked together to reach an extreme condition, an elastic snapping is formed, which mechanically fixes the relative angle of the connecting ring with respect to the barrel, allowing the push-down inner shoulder to keep pressing on the tightening ring substantially, so that the mineral liner can be firmly fixed and positioned in the barrel.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A thermos assembly comprising:
   a locking device for replacing a liner in a thermos, which locks and positions the liner stably with an elastic effect after replacing and assembling the liner in the thermos, the locking device comprising:
      a barrel, an upper end of which is a port, where the port is axially connected inward with an axial space, a binding plane is disposed at a height on an inner surface of the axial space, and an inner bottom of the binding plane is radially and annularly provided with an inner shoulder plane;
      a mineral liner comprising a radial collar which protrudes radially from the mineral liner at a height corresponding to the binding plane;
      an elastic tightening ring, an upper end of which is a top end surface, a lower end of which is a lower abutting surface, and an inner circumference of which is annularly provided with a concave ring for binding the radial collar; and
      a connecting ring, a lower end of which is axially locked with the barrel, and an inner circumference of which is coaxial with an inner thread, where the connecting ring is provided with a push-down inner shoulder having a diameter smaller than that of the inner thread and having a downward port, and an upper end of the connecting ring is a covering thread which spins to combine with a cover,
   wherein, after assembling, the push-down inner shoulder of the connecting ring exerts a force onto the top end surface of the tightening ring, forming a pressing force by elastic deformation of the tightening ring, in order to lock the barrel, the mineral liner, and the connecting ring, and
   wherein, by a reaction force which is formed on the top end surface of the tightening ring, a friction force between the tightening ring and the push-down inner shoulder is larger than a spinning and assembling force of the covering thread and the cover.

2. The thermos assembly according to claim 1, wherein an outer surface on the upper end of the barrel is a twist-on member, an inner circumference of the twist-on member is a binding plane, an inner bottom of the binding plane of the twist-on member is radially and annularly provided with an inner shoulder plane and a lead of the inner thread allows the push-down inner shoulder to press the tightening ring.

3. The thermos assembly according to claim 2, wherein a height of the tightening ring is larger than a total length of spinning lead of the twist-on member and the inner thread.

4. The thermos assembly according to claim 1, wherein an inner bottom of the axial space of the barrel is provided with a shock-proof tray which supports a bottom end of the mineral liner.

5. The thermos assembly according to claim 1, wherein the top end surface of the tightening ring is a surface of a snapping structure, and the push-down inner shoulder of the connecting ring is provided with a corresponding snap tooth.

6. The thermos assembly according to claim 5, wherein the snapping structure is provided with notches which are longitudinally parallel to radial lines on the top end surface.

7. The thermos assembly according to claim 1, wherein the mineral liner is made of ceramic.

8. The thermos assembly according to claim 7, wherein an inner surface of a loading space provided by the mineral liner is coated with a coating layer which generates a physical energy wave.

9. A thermos assembly comprising:
   a locking device for replacing a liner in a thermos, which locks and positions the liner stably with an elastic effect after replacing and assembling the liner in the thermos, the locking device comprising:
      a barrel, an upper end of which is a port, where the port is axially connected inward with an axial space, an outer surface on an upper end of the barrel is a twist-on member, a protruded buckle is disposed on a helical line of the twist-on member, a binding plane is disposed on an inner surface of the axial space at a height, and an inner bottom of the binding plane is radially and annularly provided with an inner shoulder plane;
      a mineral liner comprising a radial collar which protrudes radially from the mineral liner at a height corresponding to the binding plane;
      an elastic tightening ring, an upper end of which is a top end surface, a lower end of which is a lower abutting surface, and an inner circumference of which is provided with a concave ring for binding the radial collar; and
      a connecting ring, an inner circumference at a lower part of which is provided with an inner thread for locking the barrel axially, where the inner circumference coaxial with the inner thread, the connecting ring is provided with a push-down inner shoulder which is provided with a diameter smaller than that of the inner thread and is provided with a downward port, an upper part of the connecting ring is a covering thread which spins to combine with a cover, and an elastic slot is disposed on the inner thread at a location corresponding to the buckle at a final locking position of the barrel and the connecting ring to elastically shear the buckle, wherein, after assembling, the push-down inner shoulder of the connecting ring exerts a force onto the top end surface of the tightening ring, forming a pressing force by elastic deformation of the tightening ring, in order to lock the barrel, the mineral liner, and the connecting ring, and wherein, by the snapping and positioning of the buckle and the elastic slot, a locking angle between the connecting ring and the barrel is fixed.

10. The thermos assembly according to claim 9, wherein an outer surface on an upper end of the barrel is a twist-on member, an inner circumference of the twist-on member is a binding plane, an inner bottom of the binding plane of the twist-on member is radially and annularly provided with an inner shoulder plane, and a total height of the inner thread is smaller than a total height of the twist-on member.

11. The thermos assembly according to claim 10, wherein a height of the tightening ring is larger than a total length of spinning lead of the twist-on member and the inner thread.

12. The thermos assembly according to claim 9, wherein an inner bottom of the axial space of the barrel is provided with a shock-proof tray which supports a bottom end of the mineral liner.

13. The thermos assembly according to claim 9, wherein the mineral liner is made of ceramic.

14. The thermos assembly according to claim 13, wherein an inner surface of a loading space provided by the mineral liner is coated with a coating layer which generates a physical energy wave.

* * * * *